Patented Apr. 25, 1933

1,905,848

UNITED STATES PATENT OFFICE

ARNOLD J. GELARIE, OF NEW YORK, N. Y.

ZIRCONIUM CITRATE HEXAMETHYLENETETRAMINE

No Drawing.   Application filed July 30, 1928.   Serial No. 296,423.

My invention relates to a new composition of matter, to wit, zirconium citrate hexamethylenetetramine, one method of making which is as follows:

5 g. of chemically pure zirconium-tetrachloride or zirconium-oxy-chloride are dissolved in 5 c.c. of water, and 25 c.c. of ethyl alcohol are added to the solution. To the resulting mixture there are added 12.5 c.c. of a 20% citric acid solution in ethyl alcohol resulting in the immediate formation of a gelatinous precipitate of zirconium citrate. To this precipitate there are added 90 c.c. of a 7% solution of hexamethylenetetramine in ethyl alcohol with the result that the gelatinous precipitate becomes somewhat heavier and coarser. The precipitate, which filters rather slowly because of its gelatinous nature, is then washed with ethyl alcohol and dried with ether. The white powder thus obtained is zirconium-citrate-hexamethylenetetramine. It is easily soluble in water and almost neutral, having a pH of 6.55. The yield of this material from the above example is 8 g. It is insoluble in alcohol and ether but readily soluble in water or in aqueous salt solution. Its chemical formula is most probably $C_{12}H_{16}O_9Zr$. and its molecular weight 394, as deduced from the following analysis:

|  | Percent |
|---|---|
| Zirconium calculated | 20 |
| Zirconium found | 19.21 |
| Nitrogen calculated | 12.50 |
| Nitrogen found | 12.20 |
| Carbon calculated | 31.02 |
| Carbon found | 26.88 |
| Hydrogen calculated | 3.57 |
| Hydrogen found | 4.94 |

This zirconium salt possesses valuable therapeutic properties also when used alone.

The diseases for the treatment of which my composition of matter is of great value are syphilis, infectious icterus (Weil's disease), lupus erythematodes, tuberculosis of the skin, actinomycosis and certain forms of asthma resulting from infection of the bronchi. Certain forms of arthritis also respond favorably. The proper dosage for an injection is approximately 1 gram for adults and ½ gram for younger persons, the proportion of the zirconium salt to the fatty acids being 10 to 1. The number of injections depends upon the condition of the patient, for instance, in the case of bronchial asthma of infectious origin a cure may be effected by from three to ten injections, or in mild cases, or cases treated in a very early stage, even by a single injection. According to the condition of the patient the injections may be made once or twice a week.

In the case of Vincent's gingivitis my mixture acts almost as a specific although not given by injection. Five drops of a solution containing 2% of the fatty acids and .5% of the zirconium salt in a glass of water and used as a mouthwash has cured cases of Vincent's gingivitis within two or three days. Oxygen is set free when this solution comes into contact with mucous membranes and this increases the permeability of the cells, making them more accessible for other medication.

I claim:

1. Zirconium-citrate-hexamethylenetetramine.

2. The process of making zirconium-citrate-hexamethylenetetramine which consists in causing a reaction between a soluble zirconium-chloride and citric acid and treating the resulting zirconium-citrate with hexamethylenetetramine.

ARNOLD J. GELARIE.